(12) United States Patent
Kuhls

(10) Patent No.: US 9,262,617 B2
(45) Date of Patent: Feb. 16, 2016

(54) METHOD FOR PROVIDING SOFTWARE TO BE USED BY A CONTROL UNIT OF A VEHICLE

(75) Inventor: Burkhard Kuhls, Stadtbergen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2948 days.

(21) Appl. No.: 10/786,224

(22) Filed: Feb. 26, 2004

(65) Prior Publication Data

US 2004/0230803 A1 Nov. 18, 2004

Related U.S. Application Data

(63) Continuation of application No. PCT/EP02/07398, filed on Jul. 4, 2002.

(30) Foreign Application Priority Data

Aug. 27, 2001 (DE) .................................. 101 40 721

(51) Int. Cl.
*H04L 29/06* (2006.01)
*G06F 21/33* (2013.01)
*G06F 21/51* (2013.01)
*G06F 21/57* (2013.01)
*G06F 21/64* (2013.01)
*H04L 9/32* (2006.01)

(52) U.S. Cl.
CPC .............. *G06F 21/33* (2013.01); *G06F 21/335* (2013.01); *G06F 21/51* (2013.01); *G06F 21/572* (2013.01); *G06F 21/64* (2013.01); *H04L 9/3247* (2013.01); *H04L 9/3263* (2013.01); *G06F 2221/2111* (2013.01); *G06F 2221/2115* (2013.01); *H04L 2209/84* (2013.01)

(58) Field of Classification Search
CPC .............. H04L 63/0823; H04L 9/3294; H04L 63/0428; H04L 9/3247; H04L 2209/84; H04L 9/3263; B60R 25/24
USPC .................................................. 713/187, 155
See application file for complete search history.

(56) References Cited

U.S. PATENT DOCUMENTS 5,768,389 A * 6/1998 Ishii ................................ 380/30
5,844,986 A 12/1998 Davis
5,957,985 A * 9/1999 Wong et al. ..................... 701/33

(Continued)

FOREIGN PATENT DOCUMENTS

DE 198 20 605 A1 5/1998
DE 199 22 946 A1 5/1999

(Continued)

OTHER PUBLICATIONS

XP-002148724—"Public-key certificates" pp. 559-561.

(Continued)

*Primary Examiner* — Ali Abyaneh
*Assistant Examiner* — Carlton Johnson
(74) *Attorney, Agent, or Firm* — Crowell & Moring LLP

(57) ABSTRACT

In a method of providing software for use by a control unit of a vehicle, before its use by the control unit, the software is signed according to a public-key method against a falsification, using the secret or private key of a software signature site. The signed software is checked for integrity by using the public key complementary to the secret key of the software signature site.

11 Claims, 1 Drawing Sheet

(56) References Cited

U.S. PATENT DOCUMENTS

| | | | |
|---|---|---|---|
| 6,292,892 B1 * | 9/2001 | Davis | 713/156 |
| 6,330,670 B1 * | 12/2001 | England et al. | 713/2 |
| 6,463,535 B1 * | 10/2002 | Drews | 713/176 |
| 2002/0023223 A1 * | 2/2002 | Schmidt et al. | 713/187 |

FOREIGN PATENT DOCUMENTS

| | | |
|---|---|---|
| DE | 100 08 973 A1 | 2/2000 |
| EP | 0 813 132 A3 | 12/1997 |
| EP | 0 939 012 B1 | 2/1999 |
| EP | 1 127 756 A2 | 2/2001 |
| WO | WO 00/16229 | 3/2000 |
| WO | WO 00/72149 A1 | 11/2000 |
| WO | WO 01/13574 A1 | 2/2001 |

OTHER PUBLICATIONS

XP-002235347—"Internet X.509 Public Key Infrastructure Data Validation and Certification Server Protocols" Adams, et al—Experimental—pp. 1, Feb. 2001.

XP-002247370—"Internet X.509 Public Key Infrastructure Certificate and CRL Profile" Housley et al, Standards Track, Jan. 1999, pp. 1-129.

* cited by examiner

METHOD FOR PROVIDING SOFTWARE TO BE USED BY A CONTROL UNIT OF A VEHICLE

CROSS-REFERENCE TO RELATED APPLICATIONS

This application is a CONTINUATION of PCT Application No. PCT/EP02/07398 filed on Jul. 4, 2002.

BACKGROUND AND SUMMARY OF THE INVENTION

This application claims the priority of German patent document 101 40 721.1, filed 27 Aug. 2001, the disclosure of which is expressly incorporated by reference herein.

The invention is directed to a method of providing software for use by a control unit of a vehicle, such as a motor vehicle or motorcycle.

Control units for motor vehicles normally have a sequence control which is controlled by software. After the manufacture of the control unit by the company producing the vehicle or by a supplier, the software is stored in the control unit, and is maintained there after the unit is mounted. As a result, the software can be exchanged or altered only in a damaging manner.

It is therefore an object of the present invention to improve the software/hardware combination, particularly of a motor vehicle or of a passenger car.

According to the invention, this object is achieved by signing software provided for use by a control unit of a vehicle (particularly of a motor vehicle or motorcycle). A public-key method is used to protect against falsification by using the secret or private key of a software signature site. In particular, the public-key method uses a special pair of keys, specifically a secret private key and a public key complementary to the latter.

As an alternative or in addition, in another embodiment of the invention, a software signature certificate is generated using the public key of the software signature site and the secret key of a control entity (a so-called trust center) within the framework of a public-key method.

As a further alternative or addition, a control entity certificate or trust center certificate may be generated by using the secret key of the control entity.

According to another embodiment of the invention clearing code data may be signed by using the secret key of a clearing code site within the framework of a public-key method.

According to another embodiment of the invention, a clearing code site signature certificate may be generated by using the secret code of the control entity—the trust center—within the framework of a public-key method. In addition, the trust center certificate may be stored in the control unit in a manner protecting it against a falsification and/or an exchange, as in a protected memory, a memory area, or the like. The clearing code site signature certificate, the software signature certificate, the clearing code data and their signature as well as the software and its signature may be stored in the control unit.

As an alternative or in addition, it is provided in another embodiment of the invention that the software signature certificate has one or more validity restrictions, such as, in particular, a restriction to one or more control unit types.

Similarly, the clearing code site signature certificate may also have one or more validity restrictions, such as, in particular, a restriction to a certain control unit which is specified, for example, by means of a number, identification, or the like, invariably stored in this control unit, or the vehicle identification number.

As an alternative or in addition, it is provided in another embodiment of the invention that the software signature certificate is checked for integrity within the framework of a public-key method, while using the public key of the trust center.

The signed software may be checked for integrity within the framework of a public-key method, by using the public key of the software signature site contained in the software signature certificate. Correspondingly, the clearing code site signature certificate may be checked for integrity within the framework of a public-key method using the public key of the trust center.

The signed clearing code data may be checked for integrity within the framework of a public-key method using the public key of the clearing code site contained in the clearing code site signature certificate.

As a further alternative or in addition, the control unit may be equipped with a sequence controlled microprocessor which carries out one of the above-described methods using the public-key method.

Other objects, advantages and novel features of the present invention will become apparent from the following detailed description of the invention when considered in conjunction with the accompanying drawings.

BRIEF DESCRIPTION OF THE DRAWINGS

The single FIGURE is a graphic representation of a method according to the invention for providing software for operating a control unit in a vehicle, particularly in a motor vehicle or motorcycle.

DETAILED DESCRIPTION OF THE DRAWINGS

Figure 1:
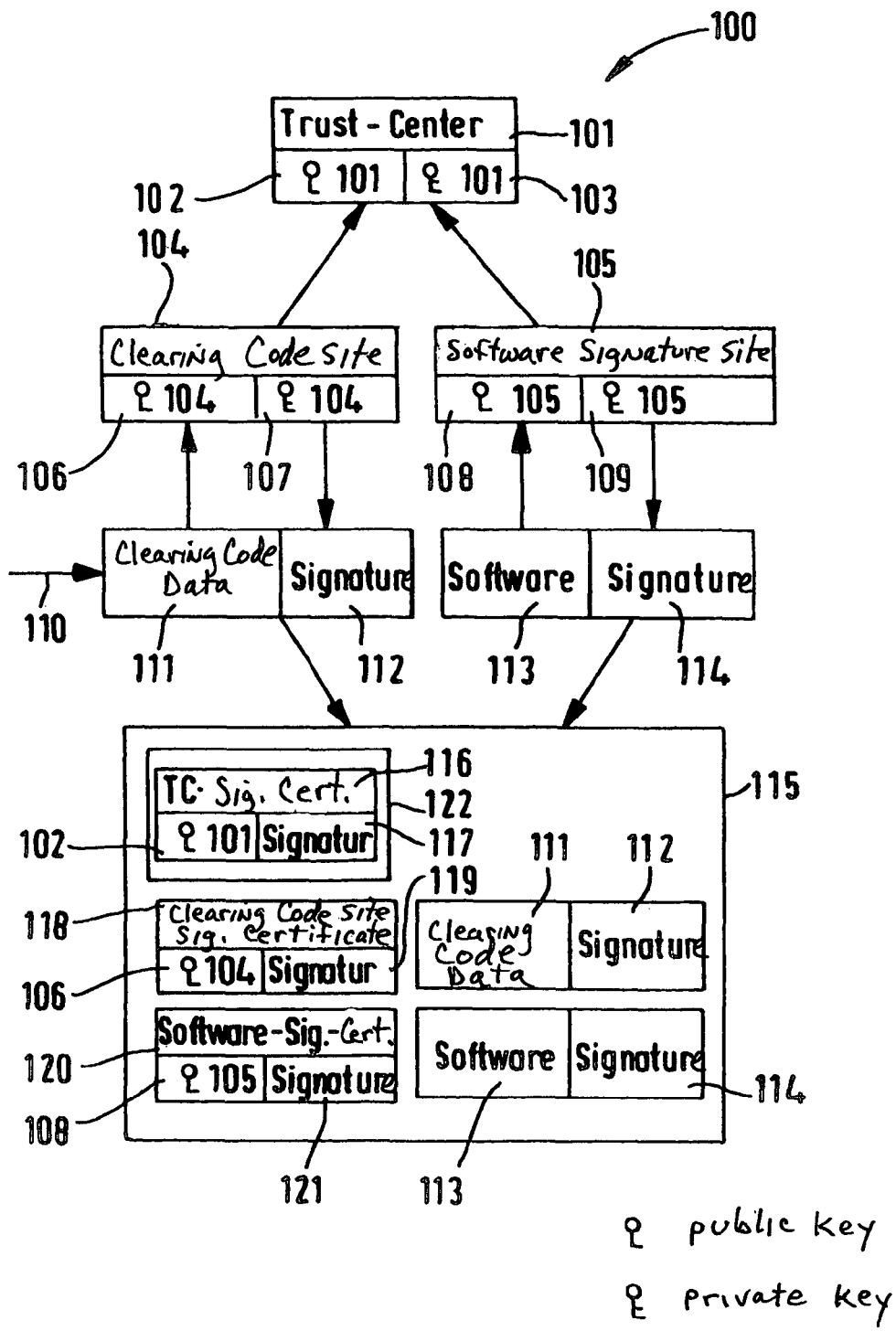

In the flow chart 100 illustrated in FIG. 1, which uses the known public-key method, a program code for the sequence control of a control unit 115 (that is, a control unit software 113) is transmitted to a so-called software signature site 105 for the purpose of its signature. The control unit 115 is a program-controlled data processing unit which preferably has a programmable memory and a microprocessor. By means of the signature, it can be detected whether the program code has been changed or manipulated after the signature, in a manner explained in detail hereinafter.

Specifically, the control unit is a conventional control unit in a vehicle for controlling or regulating actuators and other program-controlled equipment of a vehicle, such as a communication system, an audio system or a navigation system. (Although currently a large number of control units for different functions or actuators are provided in vehicles, the control unit according to the invention may also be one or more program-controlled data processing units which take over the controlling and/or regulating tasks of more than one control unit.)

The software signature site 105 requests a software signature certificate 120 from a so-called trust center 101 of the vehicle manufacturer in whose vehicle the control unit 115 is installed or to be installed. The software signature site 105 preferably is the manufacturer of the software 113, in which case the latter is preferably also the manufacturer of the control unit 115.

Using its (non-public) private key 103 as well as the public key 108 of the software signature site 103, the trust center 101 generates the software signature certificate 120. This software signature certificate 120 includes in particular the public key 108 (e.g., a third public key) of the software signature site 105, preferably one or more validity restrictions (not shown), and a signature 121 (e.g., a third signature) generated by the trust center 101. The signature permits checking as to whether the certificate has been changed or manipulated since its "signing" or signature.

A validity restriction in the software signature certificate 120 checked by the control unit 115 with respect to its compliance, may be a restriction concerning the number of operating hours, a running or mileage performance, a locality limitation (with respect to the location of the vehicle), a time indication or time duration, one or more vehicle types, one or more control units or control unit types, a vehicle identification number or a control unit number. The software signature certificate preferably restricts use of the software to one or more control unit types. A further restriction may consist of the fact that the manufacturer of a software can write the latter into a control unit or store it there or operate it there only if the manufacturer of the software is also the manufacturer of the control unit. Checking of one or more validity restrictions preferably takes place by a sequence-controlled microprocessor (not shown) provided in the control unit 115, the sequence control or software of this microprocessor being designed correspondingly.

Furthermore, the trust center 101 uses its secret key 103 to generate a trust center signature certificate 116. The latter includes the public key 101 and a signature 117 generated using the secret key 103 of the trust center 101.

Using its private or secret key 109 and the software 113, the software signature site 105 generates a signature 114 by means of which it can be checked by the control unit (in particular, a program-controlled microprocessor that executes a computer program product sequence) whether the software 113 has been changed after its signing by means of the signature 114.

The certificates 116 and 120 as well as the software 113 and their signature 114 are transmitted into the control unit 115 and stored there. The storage of the trust center signature certificate 116 takes place in a protected memory or memory area 122, which prevents it from being changed and/or exchanged. When the manufacturer of the software and the manufacturer of the control unit are the same company, this preferably takes place, in whole or in part, by the manufacturer before the delivery of the control unit to the vehicle manufacturer.

For actualizing the software stored in the control unit, or for providing additional or alternative software in the control unit 115, according to the invention, several methods can be used for installing the software in the vehicle. This can take place, for example, during a shop visit, by way of a diagnostic plug or a communication interface of the vehicle, or by a data carrier handed over by, the vehicle owner, such as a CD-ROM, DVD or chip card. The software is then played in, possibly by way of a reading device for the corresponding data carrier provided in the motor vehicle.

Before the control unit 115 executes the software 113 received in this manner, in a first step it checks whether the software signature certificate 120 has been changed or manipulated, using the public-key method based on the software signature certificate 120 (which has the public key 108 of the software signature site 105 and the signature 121 of the trust center 101) and the public key 102 of the trust center 101 stored in the protected memory or memory area 122.

If no change or manipulation is detected, in a second step the control unit checks whether the software 113 has been changed or manipulated, based on the public-key method, using the public key 108 of the software signature site 105 (which had been checked in the first step by using the public key 102 of the trust center 101 with respect to its unchanged condition) and the software 113 and the signature 114.

In the embodiment described hereinafter, the positive course of the check in the first and second step, preferably by a processor (not shown) of the control unit, is a necessary but not sufficient prerequisite for the execution of the software 113 by the control unit 115. That is, an additional check is preferably made, for example, by the control unit 115 or a sequence-controlled microprocessor (not shown) provided in the control unit 115, whether one or more validity restrictions or validity prerequisites have been met (such as an operating hour restriction on the usability of the certificate 120). Such validity restrictions or prerequisites are preferably filed in the software signature certificate 120 by the trust center 101. As required, compliance with the validity restrictions or validity prerequisites constitutes another condition for the execution of the software 113 by the control unit 115.

In another embodiment, which will not be discussed here in further detail, these are the sole or sufficient prerequisites for the execution of the software by the control unit.

Unless already stored in the control unit 115 or in the vehicle, the signed software (which has the control unit software 113, the software signature 114, and the software signature certificate 120 provided with the public key 108) is made available to the user of a vehicle on a data carrier (not shown), such as a CD-ROM or DVD, optionally with additional software. Its data content can be accessed, for example, by way of a corresponding data processing device (not shown) which is connected with at least one control unit of a motor vehicle.

In the discussion that follows, it is assumed that the user wants to utilize software available by the data carrier or the additional functionality offered thereby, and correspondingly wants to load the software into one or more control units and to execute it there.

In the preferred embodiment discussed here, steps are required in addition to the above-mentioned steps, or prerequisites are to be met. In the embodiment described here, the owner of the vehicle establishes contact with a so-called clearing code site 104 by telephone or over the Internet from the vehicle. After clarification of the manner of payment modalities the owner selects the corresponding software to be cleared, and transmits the vehicle identification number and/or a number characterizing the corresponding control unit, or the like. (This can also take place electronically by reading out and transmission from the corresponding one or more control units.) In the case of a time-dependent usage fee for the software, the owner also indicates the time period for which he wants to use the software. So-called clearing code data 111 are generated on the basis of this usage information 110.

The clearing code site 104 requests a so-called clearing code site signature certificate 118 from the trust center 101. Using the public key 106 of the clearing code site 104 and the secret key 103 of the trust center 101, the trust center 101 generates the clearing code site signature certificate 118, using the public-key method.

Furthermore, the software 113, the signature 114 and/or information or a software number or the like derived therefrom may be filed at the clearing code site 104; it may also be entered (partly or completely) into the clearing code site signature certificate 118. The clearing code site signature certificate 118, in particular, has the public key 106 of the clearing code site 104 and the signature 119 generated by the trust center 101. By means of the signature 119 it can be determined whether the certificate 118 has been changed or manipulated since its "signing" or signature.

The clearing code site signature certificate 118 preferably also has one or more validity restrictions which are not explicitly illustrated. Such a validity restriction (which is checked for compliance by the control unit 115) may be, for example, a restriction concerning the number of operating hours, a running or mileage performance, a locality limitation, a time indication or time duration, one or more vehicle types, one or more control units or control unit types, a vehicle identification number or a control unit number. The clearing code site signature certificate preferably has a restriction which limits usability to a certain control unit number individualizing the control unit, or a vehicle identification number. Checking of one or more validity restrictions preferably takes place by a sequence-controlled microprocessor (not shown) provided in the control unit 115. The sequence control or software of this microprocessor is designed correspondingly.

A preferred clearing code includes part or all of the following information groups checked by the control unit 115 and compared with reference information: Software identification, vehicle identification number and/or control unit number, validity restriction, such as particularly an absolute time indication, the number of operating hours, identification of the party requesting the clearing code, for example, a vehicle dealer or a vehicle owner, identification of the clearing code site generating the clearing code, generating date and signature.

A restriction may, for example, also consist of the fact that the clearing code site can clear software and/or data for use by a navigation system provided in the vehicle (such as, in particular, map data, or the like) but not software or data for changing the engine control and/or particularly for sequence control of safety-relevant control units.

The clearing code site signature certificate 118 generated by the trust center 101 and the clearing code data 111, including their signature, are transmitted into the vehicle (not shown), and subsequently into the corresponding control unit 115 and are stored there. The transmission preferably takes place in a wireless manner, particularly by way of a mobile telephone network and/or an Internet connection.

Before the control unit 115 executes the software 113 received in this manner, in a third step it checks whether the clearing code site signature certificate 118 has been changed or manipulated, using the public-key method based on the clearing code site signature certificate 118 (which has the public key 106 of the clearing code site 104 and the signature 119 of the trust center 101) and the public key 102 of the trust center 101 stored in the protected memory or memory area 122. If not, in a fourth step the control unit 115 checks whether the clearing code data 111 have been changed 113 or manipulated using the public-key method, based on the public key 106 of the clearing code site 104 (which was checked in the third step using the public key 102 of the trust center 101 with respect to its unchanged condition), and the clearing code data 111, including their signature 112.

Preferably, an additional check is made in a fifth step (for example, by the control unit 115 or a sequence-controlled microprocessor (not shown) provided in the control unit 115) whether one or more validity restrictions or validity prerequisites have been met. The latter are preferably filed in the clearing code site signature certificate 118 by the trust center 101. Otherwise, the release of the software or its execution is blocked, particularly by the microprocessor.

The positive course of the check in the third and fourth step, as well as, if required, the positive check in the fifth step, preferably by a processor (not shown) of the control unit, in the described preferred embodiment of the invention, is sufficient for the execution of the software 113 by the control unit 115.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of providing software for use by a vehicle control unit configured to be installed in a vehicle, said method comprising:
generating a software signature certificate using a public key of a software signature site and a secret key of a control entity of a trust center of a vehicle manufacturer of the vehicle in which the vehicle control unit is configured to be installed, wherein the software signature certificate is configured to be usable to restrict use of the software to at least one type of vehicle control unit, according to a public-key method,
wherein prior to execution of the software by the vehicle control unit,
signing the software against falsification, using a secret or private key of the software signature site, according to a public-key method;
checking the software signature certificate for integrity according to a public-key method using a public key of the trust center; and
checking the signed software for integrity, using the public key of the software signature site contained in the software signature certificate, the public key of the software signature site being complementary to the secret or private key of the software signature site,
wherein a clearing code site signature certificate is further generated using the secret key of the control entity of the trust center according to a public-key method,
wherein the clearing code site signature certificate is configured to be usable to restrict use of the software to a specific vehicle control unit using a unique number individualized to said specific vehicle control unit, and wherein the method further comprises
restricting use of the software in accordance with each of the software signature certificate and the clearing code site signature certificate.

2. The method according to claim 1, wherein clearing code data are signed using a secret key of a clearing code site according to a public key method.

3. The method according to claim 1, wherein a trust center certificate is generated according to a public-key method by using the secret key of the control entity, and wherein the trust center certificate is protected against falsification and exchange, in a protected memory area in the control unit.

4. A method of providing software for use by a vehicle control unit configured to be installed in a vehicle, said method comprising:
before the software is used by the vehicle control unit,
signing the software against falsification, using a secret or private key of a software signature site, according to a public-key method;
checking the signed software for integrity, using a public key complementary to the secret or private key of the software signature site, wherein a clearing code site signature certificate, a software signature certificate and the software and the software signature are stored in the vehicle control unit, and the software signature certificate is generated using the public key of the software signature site and a secret key of a control entity of a trust center of a vehicle manufacturer of the vehicle in which the vehicle control unit is configured to be installed, wherein the software signature certificate is configured to be usable to restrict use of the software to at least one type of vehicle control unit, wherein the clearing code site signature certificate is configured to be usable to restrict use of the software to a specific vehicle control unit using a unique number individualized to the specific vehicle control unit, and restricting use of the software in accordance with each of the software signature certificate and the clearing code site signature certificate.

5. The method according to claim 1, wherein the unique number individualized to the specific vehicle control unit is stored in the vehicle control unit in an invariable manner.

6. The method according to claim 1, wherein the clearing code site signature certificate is checked for integrity according to a public key method, using a public key of the trust center.

7. The method according to claim 2, wherein the signed clearing code data are checked for integrity according to a public key method, using a public key of the clearing code site contained in the clearing code site signature certificate.

8. The method according to claim 1, wherein the vehicle control unit is equipped with a sequence-controlled microprocessor that implements one of the above-described methods.

9. A data processing system for a motor vehicle, wherein the system comprises:
a memory, and
wherein generating a software signature certificate using a public key of a software signature site and a secret key of a control entity of a trust center of a vehicle manufacturer of the vehicle in which a vehicle control unit is configured to be installed, wherein the software signature certificate is configured to be usable to restrict use of the software to at least one type of vehicle control unit, according to a public-key method,
wherein prior to execution of the software by the vehicle control unit,
signing the software against falsification, using a secret or private key of the software signature site, according to the public-key method;
checking the software signature certificate for integrity according to a public-key method using a public key of the trust center; and
checking the signed software for integrity, using the public key of the software signature site contained in the software signature certificate, the public key of the software signature site being complementary to the secret key of the software signature site,
wherein a clearing code site signature certificate is further generated using the secret key of the control entity of the trust center according to the public-key method,
wherein the clearing code site signature certificate is configured to be usable to restrict use of the software to a specific vehicle control unit using a unique number individualized to said specific vehicle control unit, and wherein the method further comprises
restricting use of the software in accordance with each of the software signature certificate and the clearing code site signature certificate.

10. A computer program product stored upon a non-transitory computer readable medium having processor executable code embodied therein to provide software for use by a vehicle control unit configured to be installed in a vehicle, the processor executable code executing via sequence control of a data processing system of a motor vehicle or motorcycle, said non-transitory computer readable medium having:
processor executable program code to generate a software signature certificate using a public key of a software signature site and a secret key of a control entity of a trust center of a vehicle manufacturer of the vehicle in which the vehicle control unit is configured to be installed, wherein the software signature certificate is configured to be usable to restrict use of software to at least one type of vehicle control unit, according to a public-key method,
wherein prior to execution of the software by the vehicle control unit, the non-transitory computer readable medium further includes processor executable program code to:
sign the software against falsification, using a secret or private key of the software signature site, according to a public-key method;
check the software signature certificate for integrity according to a public-key method using a public key of the trust center; and
check the signed software for integrity, using the public key of the software signature site contained in the software signature certificate, the public key of the software signature site being complementary to the secret or private key of the software signature site,
wherein a clearing code site signature certificate is further generated using the secret key of the control entity of the trust center according to a public-key method,
wherein the clearing code site signature certificate is configured to be usable to restrict use of the software to a specific vehicle control unit using a unique number individualized to said specific vehicle control unit, and wherein the non-transitory computer readable medium further includes processor executable program code to
restrict use of the software in accordance with each of the software signature certificate and the clearing code site signature certificate.

11. A method of providing software for use by a vehicle control unit configured to be installed in a vehicle, said method comprising:
storing, by the vehicle control unit, a software signature certificate wherein the software signature certificate is configured to be usable to restrict use of the software to at least one type of vehicle control unit;
receiving, by the vehicle control unit, signed software;
checking, by the vehicle control unit, whether the software signature certificate has been changed or manipulated;
checking, by the vehicle control unit, whether the signed software has been changed or manipulated;
storing, by the vehicle control unit, a trust center certificate that includes a public key and a signature generated using a secret key of a trust center of a vehicle manufacturer of the vehicle in which the vehicle control unit is configured to be installed;
storing, by the vehicle control unit, a clearing code site signature certificate that includes a second public key and a second signature, wherein the clearing code site signature certificate is configured to be usable to restrict use of the software to a specific vehicle control unit using a unique number individualized to said specific vehicle control unit; and
restricting use of the software in accordance with at least each of the software signature certificate and the clearing code site signature certificate, wherein the software signature certificate includes a third public key and a third signature.

* * * * *